(12) United States Patent  (10) Patent No.: US 7,805,720 B2
Chang et al.  (45) Date of Patent: Sep. 28, 2010

(54) AUTORUN FOR INTEGRATED CIRCUIT MEMORY COMPONENT

(75) Inventors: William Ho Chang, Vancouver, WA (US); Vinaynathan Viswanathan, Pune (IN)

(73) Assignee: Flexiworld Technologies, Inc., Portland, OR (US)

( * ) Notice: Subject to any disclaimer, the term of this patent is extended or adjusted under 35 U.S.C. 154(b) by 484 days.

(21) Appl. No.: 10/823,513

(22) Filed: Apr. 12, 2004

(65) Prior Publication Data

US 2005/0083741 A1 Apr. 21, 2005

Related U.S. Application Data

(60) Provisional application No. 60/462,080, filed on Apr. 11, 2003.

(51) Int. Cl.
G06F 9/44 (2006.01)
(52) U.S. Cl. .................... 717/173; 717/174; 717/178
(58) Field of Classification Search .......... 717/174–178
See application file for complete search history.

(56) References Cited

U.S. PATENT DOCUMENTS

| | | |
|---|---|---|
| 5,166,809 A | 11/1992 | Surbrook |
| 5,220,674 A | 6/1993 | Morgan et al. |
| 5,404,433 A | 4/1995 | Hosogai |
| 5,412,798 A | 5/1995 | Garney |
| 5,519,641 A | 5/1996 | Beers et al. |
| 5,564,109 A | 10/1996 | Snyder et al. |
| 5,580,177 A | 12/1996 | Gase et al. |
| 5,596,697 A | 1/1997 | Foster et al. |
| 5,613,123 A | 3/1997 | Tsang et al. |
| 5,619,649 A | 4/1997 | Kovnat et al. |
| 5,699,495 A | 12/1997 | Snipp |
| 5,832,191 A | 11/1998 | Thorne |
| 5,867,633 A | 2/1999 | Taylor et al. |

(Continued)

FOREIGN PATENT DOCUMENTS

EP 0473987 3/1992

(Continued)

OTHER PUBLICATIONS

Wiener et al., Meeting USB and IEEE1394 overcurrent protection requirements using PolySwitch devices, IEEE, Nov. 1997 pp. 442-475.*

(Continued)

*Primary Examiner*—Wei Y Zhen
*Assistant Examiner*—Satish Rampuria
(74) *Attorney, Agent, or Firm*—Kolisch Hartwell, P.C.

(57) ABSTRACT

Autorun functionality is incorporated into an integrated circuit memory device such as any USB peripheral, which has a memory component interfaced to a USB microcontroller. This provides autorun of one or more executables or application installers from a memory component with a USB interface without an intermediate hardware-based autorun feature. USB peripheral devices internally include a USB microcontroller that performs the functionality associated with identifying the device to a host computing device, such as a personal computer. Autorun firmware is embedded into the USB microcontroller. The autorun firmware enables autorun of an installable or executable application stored on the memory component of the USB device. The firmware acts as bridge component translating all commands and interactions between a host PC and the memory component.

40 Claims, 5 Drawing Sheets

U.S. PATENT DOCUMENTS

| | | | |
|---|---|---|---|
| 5,911,044 A | 6/1999 | Lo et al. |
| 5,940,843 A | 8/1999 | Zucknovich et al. |
| 5,982,520 A | 11/1999 | Weiser et al. |
| 5,987,454 A | 11/1999 | Hobbs |
| 6,009,464 A | 12/1999 | Hamilton et al. |
| 6,020,973 A | 2/2000 | Levine et al. |
| 6,043,898 A | 3/2000 | Jacobs |
| 6,044,428 A | 3/2000 | Rayabhari |
| 6,046,820 A | 4/2000 | Konishi |
| 6,070,185 A | 5/2000 | Anupam et al. |
| 6,119,153 A | 9/2000 | Dujari et al. |
| 6,138,178 A | 10/2000 | Watanabe |
| 6,141,659 A | 10/2000 | Barker et al. |
| 6,148,346 A | 11/2000 | Hanson |
| 6,167,514 A | 12/2000 | Matsui et al. |
| 6,202,023 B1 | 3/2001 | Hancock et al. |
| 6,216,183 B1 * | 4/2001 | Rawlins ............ 710/100 |
| 6,225,993 B1 | 5/2001 | Lindblad et al. |
| 6,233,611 B1 | 5/2001 | Ludtke et al. |
| 6,246,486 B1 | 6/2001 | Takahashi |
| 6,256,666 B1 | 7/2001 | Singhal |
| 6,263,387 B1 | 7/2001 | Chrabaszcz |
| 6,282,710 B1 * | 8/2001 | Boehler ............ 717/174 |
| 6,285,889 B1 | 9/2001 | Nykanen et al. |
| 6,288,790 B1 | 9/2001 | Yellepeddy et al. |
| 6,324,521 B1 | 11/2001 | Shiota et al. |
| 6,330,611 B1 | 12/2001 | Itoh et al. |
| 6,363,452 B1 | 3/2002 | Lach |
| 6,366,912 B1 | 4/2002 | Wallent et al. |
| 6,366,965 B1 | 4/2002 | Binford et al. |
| 6,366,966 B1 | 4/2002 | Laney et al. |
| 6,379,058 B1 | 4/2002 | Petteruti et al. |
| 6,389,010 B1 | 5/2002 | Kubler et al. |
| 6,389,159 B2 | 5/2002 | Gilman et al. |
| 6,405,362 B1 | 6/2002 | Shih et al. |
| 6,418,439 B1 | 7/2002 | Papierniak et al. |
| 6,421,748 B1 | 7/2002 | Lin et al. |
| 6,434,535 B1 | 8/2002 | Kupka et al. |
| 6,449,052 B1 | 9/2002 | Sherer et al. |
| 6,452,692 B1 | 9/2002 | Yacoub |
| 6,453,127 B2 | 9/2002 | Wood et al. |
| 6,473,800 B1 | 10/2002 | Jerger et al. |
| 6,477,575 B1 | 11/2002 | Koeppel et al. |
| 6,480,292 B1 | 11/2002 | Sugiyama |
| 6,487,587 B1 | 11/2002 | Dubey |
| 6,487,599 B1 | 11/2002 | Smith et al. |
| 6,493,104 B1 | 12/2002 | Cromer et al. |
| 6,529,522 B1 | 3/2003 | Ito et al. |
| 6,546,387 B1 | 4/2003 | Triggs |
| 6,546,419 B1 | 4/2003 | Humpleman et al. |
| 6,553,431 B1 | 4/2003 | Yamamoto et al. |
| 6,584,903 B2 | 7/2003 | Jacobs |
| 6,594,723 B1 | 7/2003 | Chapman et al. |
| 6,600,569 B1 | 7/2003 | Osada et al. |
| 6,603,744 B2 | 8/2003 | Mizutani et al. |
| 6,604,135 B1 | 8/2003 | Rogers et al. |
| 6,607,314 B1 | 8/2003 | McCannon et al. |
| 6,608,928 B1 | 8/2003 | Queiroz |
| 6,611,812 B2 | 8/2003 | Hurtado et al. |
| 6,623,527 B1 | 9/2003 | Hamzy |
| 6,625,472 B1 | 9/2003 | Farazmandnia et al. |
| 6,628,417 B1 | 9/2003 | Naito et al. |
| 6,633,395 B1 | 10/2003 | Tuchitoi et al. |
| 6,654,135 B2 | 11/2003 | Mitani |
| 6,658,625 B1 | 12/2003 | Allen |
| 6,678,751 B1 | 1/2004 | Hays et al. |
| 6,694,371 B1 | 2/2004 | Sanai |
| 6,697,848 B2 | 2/2004 | Hamilton et al. |
| 6,705,781 B2 | 3/2004 | Iwazaki |
| 6,735,768 B1 * | 5/2004 | Tanaka ............ 717/174 |
| 6,745,229 B1 | 6/2004 | Hauryluck et al. |
| 6,745,255 B2 | 6/2004 | Yen et al. |
| 6,751,732 B2 | 6/2004 | Strobel et al. |
| 6,760,745 B1 | 7/2004 | Tan et al. |
| 6,772,233 B2 | 8/2004 | Iida et al. |
| 6,785,727 B1 | 8/2004 | Yamazaki |
| 6,788,428 B1 | 9/2004 | Shimokawa |
| 6,798,530 B1 | 9/2004 | Buckley et al. |
| 6,826,632 B1 | 11/2004 | Wugofski |
| 6,829,672 B1 * | 12/2004 | Deng et al. ............ 711/103 |
| 6,840,441 B2 | 1/2005 | Monaghan et al. |
| 6,857,716 B1 | 2/2005 | Nagahashi |
| 6,885,362 B2 | 4/2005 | Suomela |
| 6,889,058 B2 | 5/2005 | Tordera |
| 6,898,652 B2 | 5/2005 | Peters et al. |
| 6,941,014 B2 | 9/2005 | Lin et al. |
| 6,944,687 B2 | 9/2005 | Doragh et al. |
| 6,948,165 B1 | 9/2005 | Luu et al. |
| 6,975,644 B2 | 12/2005 | Tordera et al. |
| 7,050,840 B2 | 5/2006 | Lin et al. |
| 7,055,956 B2 | 6/2006 | Olson et al. |
| 7,102,691 B2 | 9/2006 | Dischert et al. |
| 7,136,914 B2 | 11/2006 | Motoyama |
| 7,149,834 B2 | 12/2006 | Peters et al. |
| 7,174,535 B2 * | 2/2007 | Wragge ............ 717/107 |
| 7,237,046 B2 * | 6/2007 | Paley et al. ............ 710/38 |
| 7,243,153 B2 | 7/2007 | McIntyre et al. |
| 7,370,090 B2 | 5/2008 | Nakaoka et al. |
| 2001/0029531 A1 | 10/2001 | Ohta |
| 2001/0032254 A1 | 10/2001 | Hawkins |
| 2002/0012329 A1 | 1/2002 | Atkinson |
| 2002/0026492 A1 | 2/2002 | Fujita |
| 2002/0032855 A1 | 3/2002 | Neves et al. |
| 2002/0065098 A1 | 5/2002 | Hosogaya |
| 2002/0065872 A1 | 5/2002 | Genske et al. |
| 2002/0078367 A1 | 6/2002 | Lang et al. |
| 2002/0081993 A1 | 6/2002 | Toyoshima |
| 2002/0083151 A1 | 6/2002 | Adams et al. |
| 2002/0083430 A1 | 6/2002 | Kusuda et al. |
| 2002/0097408 A1 | 7/2002 | Chang |
| 2002/0097415 A1 | 7/2002 | Chang |
| 2002/0097416 A1 | 7/2002 | Chang |
| 2002/0097417 A1 | 7/2002 | Chang |
| 2002/0097418 A1 | 7/2002 | Chang |
| 2002/0097419 A1 | 7/2002 | Chang |
| 2002/0097433 A1 | 7/2002 | Chang |
| 2002/0101515 A1 | 8/2002 | Yoshida et al. |
| 2002/0145632 A1 * | 10/2002 | Shmueli et al. ............ 345/835 |
| 2003/0046447 A1 * | 3/2003 | Kouperchliak et al. ...... 709/321 |
| 2003/0084256 A1 | 5/2003 | McKee |
| 2003/0087601 A1 | 5/2003 | Agam et al. |
| 2003/0110371 A1 * | 6/2003 | Yang et al. ............ 713/100 |
| 2003/0120754 A1 | 6/2003 | Muto |
| 2003/0122934 A1 | 7/2003 | Shiohara |
| 2003/0160993 A1 | 8/2003 | Kang |
| 2003/0225971 A1 * | 12/2003 | Oishi et al. ............ 711/115 |
| 2004/0015709 A1 | 1/2004 | Chen |
| 2004/0057075 A1 | 3/2004 | Stewart |
| 2004/0070379 A1 | 4/2004 | Koretsky et al. |
| 2004/0095382 A1 | 5/2004 | Fisher et al. |
| 2004/0177355 A1 * | 9/2004 | Wragge ............ 717/174 |
| 2004/0203694 A1 | 10/2004 | Wong et al. |
| 2005/0005263 A1 * | 1/2005 | Miyazaki ............ 717/114 |
| 2006/0173980 A1 * | 8/2006 | Kobayashi et al. ......... 709/222 |
| 2007/0081486 A1 | 4/2007 | Koide |
| 2008/0003947 A1 | 1/2008 | Morris |
| 2008/0071935 A1 | 3/2008 | Ohta |
| 2008/0126628 A1 | 5/2008 | Mullis |
| 2009/0198839 A1 | 8/2009 | Banerjee |

FOREIGN PATENT DOCUMENTS

| | | |
|---|---|---|
| WO | 95/26703 | 10/1995 |
| WO | 00/06904 | 2/2000 |

WO 03/015641 2/2003

OTHER PUBLICATIONS

Remple, USB on-the-go interface for portable devices, IEEE, Jun. 2003 pp. 8-9.*

Jankovec et al., Analog circuit development system, IEEE, Sep. 2003 pp. 125-129 vol. 1.*

World Intellectual Property Organization, (Thomas C. Lee, authorized officer);"International Search Report" for PCT/US2004/011372; mailed Jun. 20, 2007; 3 pages. William Ho Chang is an inventor for both PCT/US2004/011372 and U.S. Appl. No. 10/823,513.

WIPO (Ellen Moyse and Thomas C. Lee, authorized officers);"International Preliminary Report on Patentability and Written Opinion" for PCT/US2004/011372; mailed Aug. 14, 2007; 8 pages. William Ho Chang is an inventor for both PCT/US2004/011372 and U.S. Appl. No. 10/823,513.

WIPO (Jason D. Cardone, authorized officer; International Search Report for PCT/US2003/039547; mailed Jul. 15, 2005; 4 pages. William Ho Chang is an inventor for both PCT/US2003/039547 and U.S. Appl. No. 10/823,513.

* cited by examiner

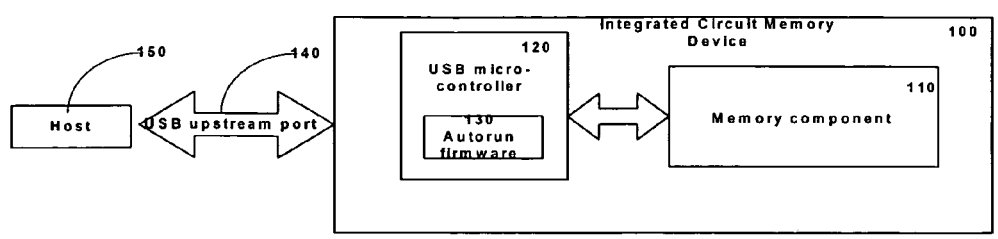
Fig. 1
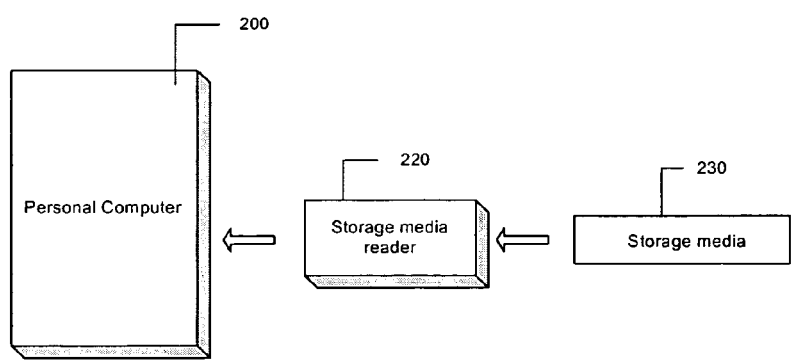
Fig. 2 – Prior Art

AUTORUN FOR INTEGRATED CIRCUIT MEMORY COMPONENT

This application claims the benefit under Title 35, United States Code, §119(e) of U.S. provisional patent application No. 60/462,080 filed Apr. 11, 2003.

TECHNICAL FIELD

This invention relates to a system and method for utilizing storage media such as flash memory for achieving autorun of an application executable or installer stored on the storage media.

BACKGROUND AND SUMMARY OF THE INVENTION

As is known in the art, some applications such as software installers may be run automatically upon insertion of a CD-ROM disc into a CD-ROM drive, which may sometimes be called a dock or reader. In operation, this automatic running of an application is provided by an autorun feature that is stored on or incorporated into CD-ROM drive dock/reader. Executables or installers stored on the CD-ROM disc are executed by the host personal computer based upon activation by the autorun feature in the CD-ROM drive dock/reader. In this implementation, the autorun feature is incorporated into the hardware drive/dock/reader, which is separate from the storage media.

Universal Serial Bus (USB) technology is rapidly gaining preference as the interfacing technology of choice for peripherals on computing devices such as personal or laptop computers. Flash memories coupled with a USB interface has become a convenient and portable storage device that can replaces floppy disks and compact disks (CDs).

However, the popular and widely-adopted Universal Serial Bus technology does not include distinct autorun features in the docks/readers. As a consequence, conventional integrated circuit memory devices such as USB memory devices do not have autorun functionality.

Accordingly, the present invention provides autorun functionality to any IC memory device, such as any USB peripheral, that has a memory component interfaced to a computing device interface microcontroller. The present invention provides autorun of one or more executables or application installers from a memory component with an interface to a computing device without an intermediate hardware-based autorun feature. As an example, such interface could be a USB interface and such computing device could be a personal computer.

For example, each USB peripheral device internally contains a USB microcontroller that performs the functionality associated with identifying the device to a host computing device, such as a personal computer. In accordance with the present invention, autorun firmware is embedded into the USB microcontroller. The autorun firmware enables autorun of an installable or executable application stored on the memory component of the USB device. The firmware acts as bridge component translating all commands and interactions between a host PC and the memory component.

Additional description and implementations of the present invention will be apparent from the detailed description of the preferred embodiment thereof, which proceeds with reference to the accompanying drawings.

BRIEF DESCRIPTIONS OF THE DRAWINGS

FIG. 1 illustrates an exemplary implementation of an autorun integrated circuit (IC) memory device according to the present invention.

FIG. 2 is a block diagram of a prior art arrangement in which a host personal computer includes an intermediate hardware dock that provides an autorun feature.

DETAILED DESCRIPTION OF PREFERRED EMBODIMENT

Figure 3:
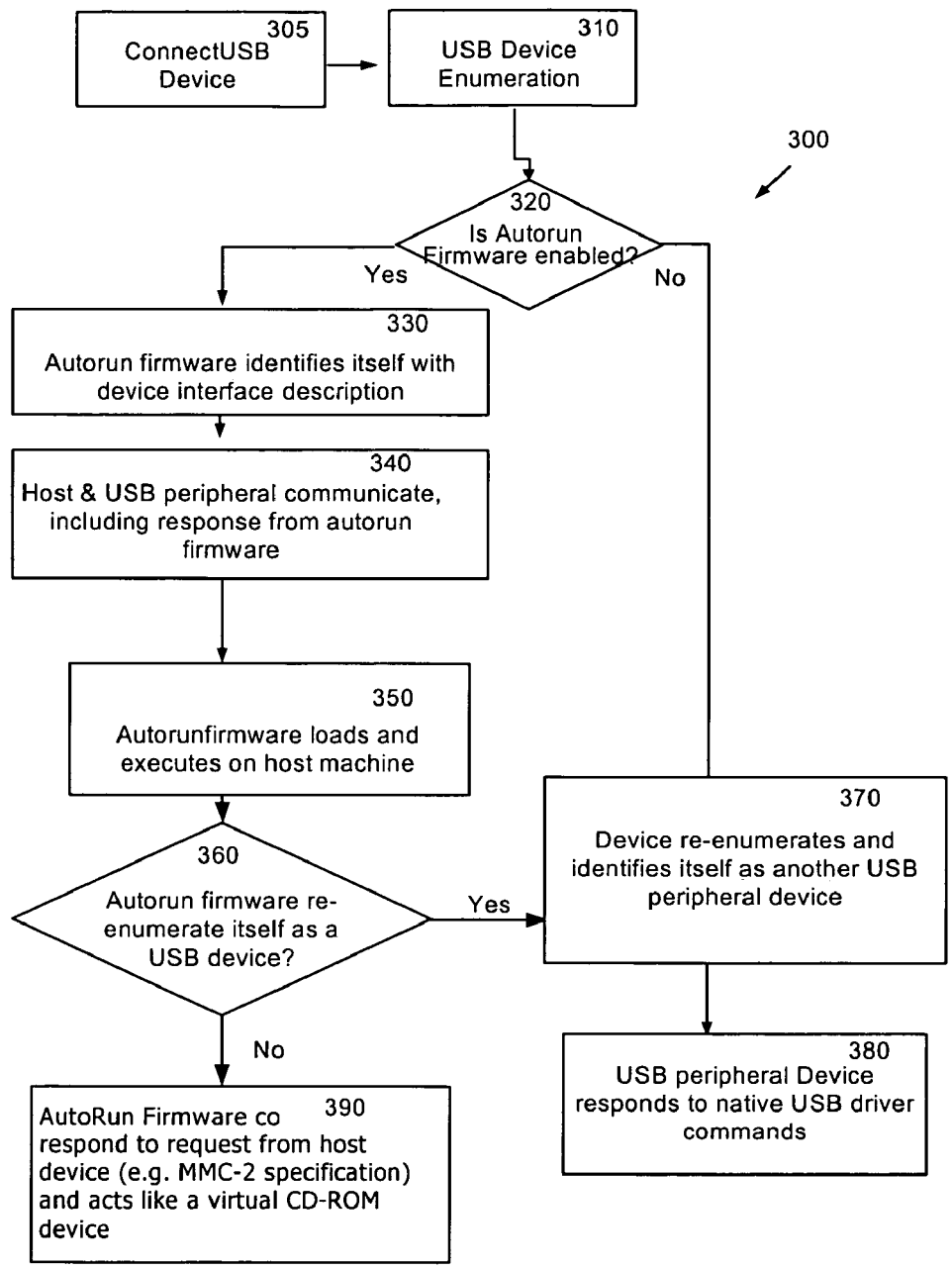
FIG. 3 is a flow diagram of an IC memory device autorun method.

FIG. 1 illustrates an exemplary implementation of an autorun integrated circuit (IC) memory device 100 according to the present invention. Autorun IC memory device may be in the form of a USB memory device, a compact flash card, a smart card, etc. For purposes of illustration, autorun IC memory device 100 will be described with reference to a universal serial bus (USB) memory device implementation.

Autorun IC memory device 100 includes a memory component 110 that communicates with a USB microcontroller 120 having autorun firmware 130 incorporated or embedded into microcontroller 120. Autorun IC memory device 100 includes an upstream port 140 for connecting to a host computing device 150 (e.g., personal or laptop computer, handheld computer, PDA, smart phone, etc., not shown). In the illustrated implementation, upstream port 140 is a USB port.

Autorun firmware 130 causes an application or executable stored in memory component 110 to be installed or run automatically upon activation of the IC memory device 100 vis-à-vis the host computing device 150. This activation may be achieved in a variety of ways including connecting or inserting the autorun IC memory device 100 into a docking system or port present on or interfaced to the host computing device 150. For example, IC memory device 100 with autorun firmware 130 incorporated into USB microcontroller 120 allows a "USB Flash Drive" storing one or more application executables or installables to be run automatically (i.e., autorun) upon activation, such as being plugged into the USB port of a host PC 150.

FIG. 2 is a block diagram of a prior art arrangement in which a host personal computer 200 includes an intermediate hardware dock 220 that provides an autorun feature for a storage medium like a CD-ROM 230. Intermediate hardware dock 220 functions as a storage media reader that may be internally integrated with or externally connected to the host personal computer 200 and the storage medium 230.

In this prior art implementation, insertion of a CD-ROM disc 230 into a CD-ROM dock/reader 220 may cause activation of an autorun feature that is stored on or incorporated into CD-ROM dock/reader 220. Executables or installers stored on the CD-ROM disc 230 may then be executed by the host personal computer 200 based upon activation by the autorun feature CD-ROM dock/reader 220.

As another example of such a prior art implementation, a flash memory card reader connected to a host computing device, such as a personal computer, may also include an autorun feature that can activate an executable or installer to run on the host computing device.

A disadvantage of such prior art implementations is that autorun features are incorporated into hardware docks or readers that are separate from the storage media. However, the popular and widely-adopted Universal Serial Bus technology does not include such distinct autorun features. As a consequence, conventional integrated circuit memory devices such as USB memory devices do not have autorun functionality. In contrast, the present invention provides autorun functionality to any IC memory device, such as any USB peripheral that has a memory component interfaced to a USB microcontroller.

FIG. 3 is a flow diagram of an IC memory device autorun method 300 that may be implemented from firmware 130 incorporated into a USB controller 120.

In step 305, a USB peripheral is inserted into or connected to a USB port of a host computing device (e.g., a personal computer).

In step 310, the host computing device performs an enumeration to identify the newly attached USB peripheral.

Step 320 is a query as to whether the USB peripheral includes autorun firmware that is enabled. If so, step 320 proceeds to step 330. If not, step 320 proceeds to step 370.

In step 330, the autorun firmware in the USB peripheral announces itself with a device interface description. For example, the device interface description may include Mass Storage Class, SCSI transparent command set, Bulk Only Transport corresponding to a CD-ROM, for example.

In step 340, the host and the USB peripheral communicate with each other using, for example a standard MMC-2 specification set. The communication includes a response to host commands from the autorun firmware according to the MMC-2 specification. As a part of the MMC-2 specification, the host requests enumeration of files in root directory and the autorun firmware responds to the request.

In step 350, the autorun firmware informs the host of the presence of an autorun executable file to be executed and provides the file to the host. For example, the file may be named "Autorun.inf," which may be stored on the memory component of the USB peripheral. The host executes the autorun executable file to provide the autorun functionality.

Step 360 is a query whether the autorun firmware is to be enumerated again or "re-enumerated." If so, step 360 proceeds to step 370. If not, step 360 proceeds to step 390. Re-enumeration allows the autorun firmware to announce itself to the host as one or more other USB peripherals (e.g. data storage device, communication adapter, etc.) or, if there is no re-enumeration, the autorun firmware can continue to function as per MMC-2 specifications.

In step 370, the autorun firmware re-enumerates or identifies itself as another USB device, such as a USB flash drive or a USB wireless (e.g., Bluetooth, WiFi, IrDA) device or "dongle." With such a re-enumeration, the autorun firmware identifies itself with device interface descriptors for the other USB devices (e.g., USB flash drive or USB Bluetooth dongle).

In step 380, the autorun firmware loads the firmware associated with the enumerated USB peripheral (e.g., USB flash drive or USB Bluetooth dongle).

In step 390, the autorun firmware is configured to not re-enumerate itself and continues to act as a virtual CD-ROM type device implementing the MMC-2 specifications.

Process steps 320, 330, 340, 350 and 360 correspond to the autorun firmware implementation. Step 390 provides for the implementation of a virtual mass storage device from a memory component that implements SCSI command set and MMC-2 specifications.

Figure 4A:
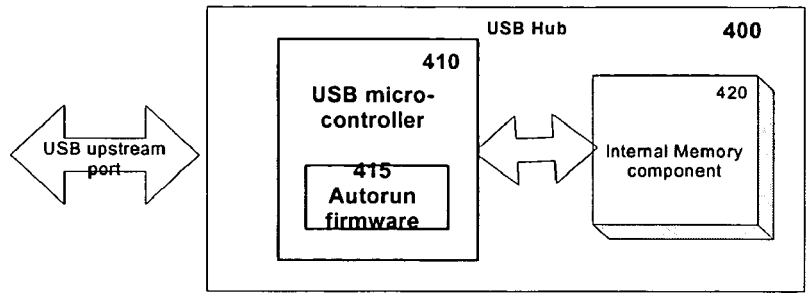
FIGS. 4A and 4B illustrate autorun firmware according to the present invention be embedded into alternative USB device configurations
Figure 4B:
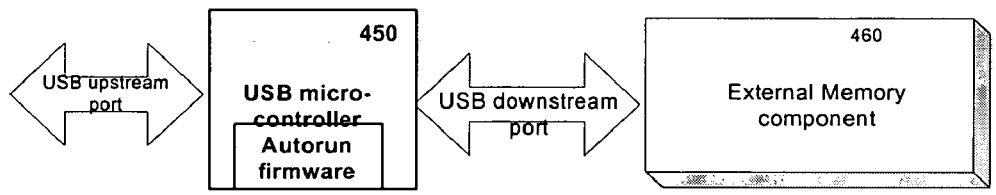

Autorun firmware according to the present invention can be embedded into multiple USB device configurations to provide a variety of unique USB peripherals with autorun functionality and into other peripheral devices with similar functionality. For example, FIG. 4A shows a USB hub 400 in which a USB microcontroller 410 with auto run firmware 415 communicates with an internal memory component 420. In FIG. 4B, a USB microcontroller 450 is connected to an external memory component 460 through a USB downstream port 470.

With reference to FIG. 4A, the USB microcontroller 410 that forms a part of the USB hub 400 typically is a repeater type entity allowing for cascaded multiple USB peripherals to connect through a single upstream port to a host system. The USB microcontroller 410 includes support for programming capability, which includes the autorun firmware 415. The Autorun firmware can then be ported to work on the USB microcontroller 410. The firmware may be stored on the internal memory component 420. Alternatively, the Autorun firmware may be stored on external memory that is in an attached USB memory component 430.

Figure 5:
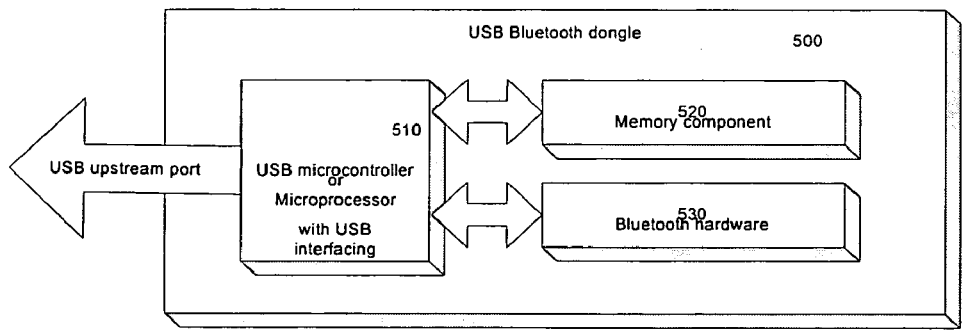
FIG. 5 is a block diagram of a USB peripheral having multiple functionalities.

As another configuration, FIG. 5 is a block diagram of a USB peripheral 500 having multiple functionalities. In this implementation, USB peripheral 500 includes an internal microprocessor with USB interfacing 510, or alternatively a USB microcontroller, that communicates with a memory component 520 and wireless (e.g., Bluetooth) networking hardware 530. As a result, USB peripheral 500 is capable of operating as a wireless (e.g., Bluetooth) networking device or "dongle" and as USB flash drive, both of which are accessible with autorun functionality.

In one configuration, the microprocessor 510 has USB interfacing ability. It is coupled with a memory component 520 and Bluetooth radio component 530. Microprocessor 510 implements client layers of the Bluetooth stack. The firmware that the microprocessor 510 executes is stored in memory component 520. The autorun firmware can also be additionally stored as a part of the functionality of existing firmware or separately in the memory component 520. In another configuration, the microprocessor 510 may not directly have USB interfacing capability and could use a separate USB microcontroller (not shown).

A feature of including autorun firmware in USB peripherals is that software applications can be bundled with the USB peripherals. The bundled software application may or may not utilize the USB peripheral.

Figure 6:
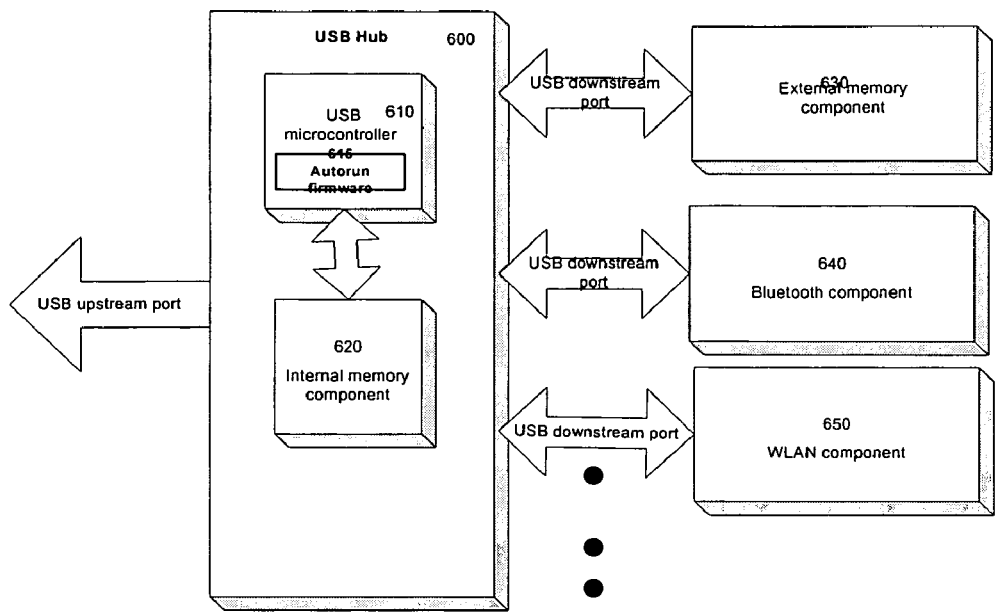
FIG. 6 is a block diagram of a USB hub with autorun firmware and access to multiple distinct functionalities.

As an example, FIG. 6 is a block diagram of a USB hub 600 that includes a USB microcontroller 610 with autorun firmware 615 and access to one or multiple distinct functionalities or USB peripherals, such as an external memory component 630, a Bluetooth networking component 640, or a WLAN component 650. Such USB peripherals 630-650 could be formed in combination with USB hub 600. USB hub 600 may be externally connected with one or more of these components 630-650, as illustrated, or alternatively one or more of the components 630-650 can be internally integrated to form a USB peripheral or device with multiple distinct functionalities.

There could be multiple executions of autorun firmware from each or some of these peripherals. Thus the autorun firmware allows for distribution of software (e.g. device drivers, synchronization software, etc.) that can be autorun along with any USB peripheral.

The implementation options also include mechanisms for allowing the autorun feature to be enabled or disabled by an external mechanism (e.g., switch) that is included on the device or peripheral. The switch could be manually operable by a person. The switch could be a simple two-mode (e.g., autorun on/off) switch or could be a switch that selects from among more than two modes.

Figure 7:
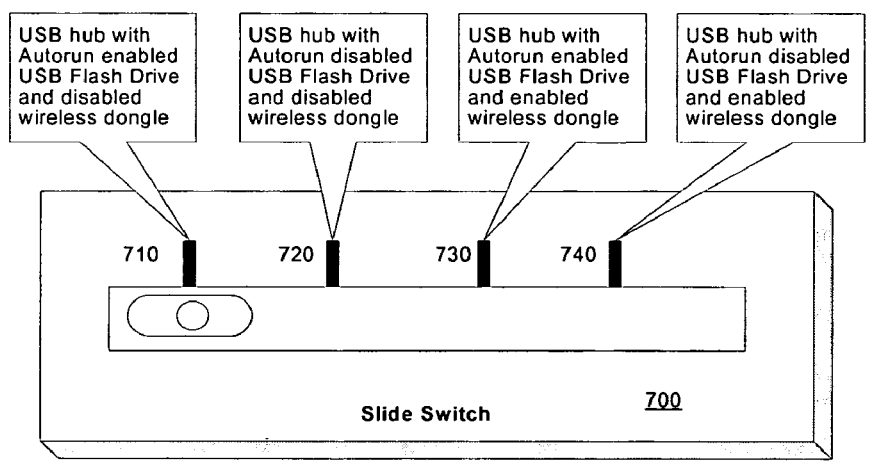
FIG. 7 is a schematic diagram of a person-operable physical slide switch.

FIG. 7 is a schematic diagram of a person-operable physical slide switch 700 that allows a person to select from among multiple modes, functionalities, or peripherals available on a USB device or "dongle." As an example, switch 700 relates to features or peripherals available from USB hub 600 of FIG. 6, including external memory component 630, and wireless dongle or module (640 or 650) for adding wireless (e.g. Bluetooth, WiFi, IrDA) interface to its host PC.

In this exemplary illustration, switch 700 has 4 user-selectable positions. In position 710, autorun functionality is enabled, the wireless component is disabled. In position 720, autorun functionality is disabled, wireless component is disabled. In position 730, autorun functionality is enabled, wireless component is enabled. In position 740, autorun functionality is disabled, wireless component is enabled.

The autorun firmware enables the distribution of software that can be autorun from a memory component. There is also a unique security mechanism that can be incorporated to protect the software that is installable or executable from the memory component by the autorun firmware.

A section of the internal memory component (e.g., memory component 620, FIG. 6) may be protected from public access by password protecting it or by physical security means such as a lock, among other means. The flash memory component can also be segmented into public and private sections. Private sections can be used to store installable or executables that cannot be viewed or accessed by the user, and public sections can be viewed or accessed by users in a conventional manner. The installable or executable software being distributed through the memory component can be stored in the protected region of the memory component. Security by way of copy protection of this installable software can be achieved by allowing only an application launcher executable, which is autorun from the memory component, to access the installable software.

In one implementation, the application launcher executable has the following characteristics: it is autorun from memory component, and it has access to the protected or private region of memory component. This access is gained by authenticating itself to the memory controller (e.g. USB microcontroller) and/or to the installable software in the protected region of the memory component. The authentication mechanism may be a password-based mechanism or a more involved cryptographic algorithm. Among the various techniques used for authentication are digital signatures and unique identifiers like the Bluetooth Device Address, MAC address, etc. The application launcher executable may authenticate itself directly to the memory controller software and/or installable software or to a separate authentication software that resides in the protected region of the memory component.

The application launcher executable may be built generically to execute any or all executables and installables that exist within the protected region of the memory component. Alternatively, the application launcher executable may be programmed to launch a particular executable or installable from the protected region. Considering the possibility of the memory component being segmented into "n" protected sections where n is greater than 1, the application launcher executable may access one or more of these sections in the mechanism described herein. The protected memory region may contain, for example, executable software (also called an application executable), or installable software (also called an application installable), or protected data.

Figure 8:
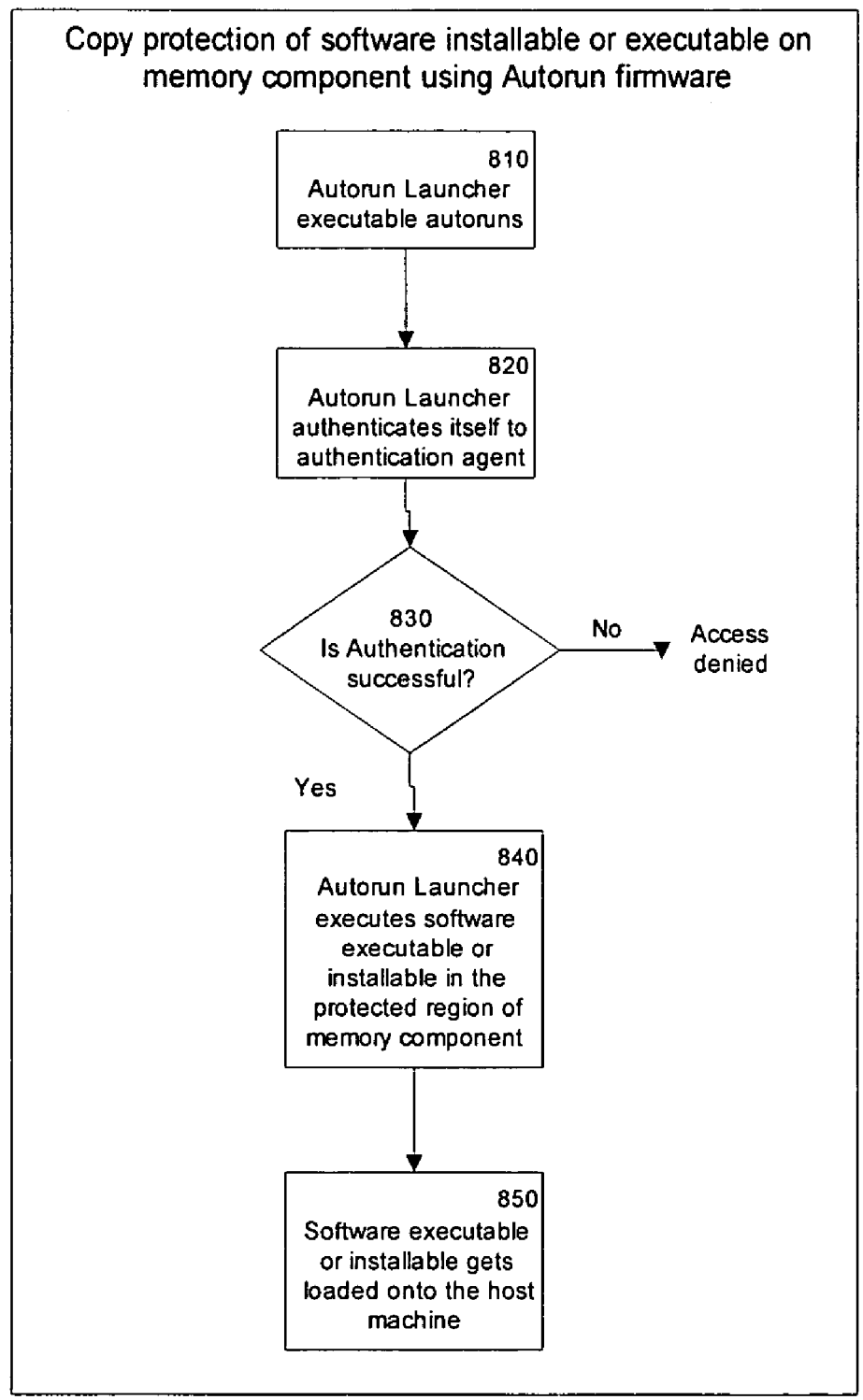
FIG. 8 is a flow diagram of a software-implemented copy protection method.

FIG. 8 is a flow diagram of a software-implemented copy protection method for protecting of software that is executable or installable on using autorun firmware.

In step 810, an application launcher executable that is stored in a memory component of an IC memory device is run automatically on a host computer by an autorun firmware stored on the IC memory device. The autorun firmware is operates automatically upon activation of the IC memory device, such as occurs when the memory device is plugged into a port or socket of the host computer.

In step 820, the application launcher authenticates itself to authentication agent software that resides in the protected region of the memory component. The authentication agent software may be incorporated within the software executable or installable that is being protected or may be a separate application. The authentication algorithm may be password based or may involve cryptographic techniques.

Step 830 is a query whether the authentication is successful. If not, access to the protected executable or installable is denied. If authentication is successful, step 830 proceeds to step 840 and the application launcher executable gains access to the protected memory region.

In step 840, the application launcher executable executes the application executable or installable that is stored in the protected region of the memory component. The application launcher executable may also be programmed to execute any or all executables and installables that exist within the protected region of the memory component.

In step 850, the executables and installables thus launched are executed on the host computer.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. An integrated circuit flash memory device connectable by a user to a host computing device, the integrated circuit flash memory device for enabling said user to run or execute at the host computing device a protected software or data without providing said user means to copy the protected software or data stored in the integrated circuit flash memory device, the integrated circuit flash memory device comprising:

a controller for controlling interaction between the integrated circuit flash drive memory device and the host computing device;

an application launcher software stored on the integrated circuit memory device and executable on the host computing device upon activation of the integrated circuit memory device with the host computing device;

a memory component that includes a protected memory component storing at least part of a protected software or data that is installable or executable on the host computing device by said user and the protected software or data stored in the protected memory component cannot be viewed or accessed by said user;

the application launcher software stored on the integrated circuit memory device including means to run automatically on the host computing device upon activation of the integrated circuit memory device with the host computing device, means to access, by the application launcher software, protected software or data from the protected memory component of the integrated circuit flash memory device in dependence of a successful authentication of the application launcher software that run automatically on the host computing device upon activation of the integrated circuit memory device with the host computing device, and means to install, execute or run, by the application launcher software, on the host computing device, the protected software or data accessed from the protected memory component of the integrated circuit flash memory device;

whereby the flash memory device enables said user to operate, run or execute protected software or data on the host computing device from the protected memory component without enabling said user means to access, view or copy the protected software or data from the protected memory component of the integrated circuit flash memory device.

2. The integrated circuit flash drive memory device of claim 1 in which the flash memory device is further operable with the host computing device in accordance with a first device interface description for identifying with the host computing device with the first device interface description, and subsequent to an autorun operation upon plugging the integrated circuit flash memory device to the host computing device and in response to a query, the flash memory device re-enumerates itself with a second device interface description and identifies to the host computing device with the second device interface description.

3. The integrated circuit flash drive memory device of claim 1 further including a public memory component that can be viewed or accessed by the user.

4. The integrated circuit flash drive memory device of claim 1, further comprising a wireless component for adding wireless interface to the host computing with the wireless component.

5. The integrated circuit flash drive memory device of claim 1 further comprising a user operable external manual switch on the integrated circuit flash drive memory device that is accessible and operable by said user to select from among plural operating states that include a first state in which the application launcher software is operable and a second state in which the application launcher software is not operable.

6. The integrated circuit flash drive memory device of claim 1, further comprising one upstream port for interfacing or connecting with the host computing device and two or more downstream ports having at least one downstream port associated with at least a wireless component and at least one downstream port associated with a memory component.

7. The integrated circuit flash drive memory device of claim 1 further comprising a connection that is connectable to a host computing device over a Universal Serial Bus connection port.

8. The integrated circuit flash drive memory device of claim 7 further comprising a Universal Serial Bus hub for enabling interface with one or more functional components or devices, the Universal Serial Bus hub including one upstream port for interfacing with the host computing device and one or more downstream ports for interfacing or interacting to one or more functional components or devices, the one or more functional components or device including a memory component.

9. The integrated circuit flash drive memory device of claim 1 in which the controller and the memory component operate together as a storage device to the host computing device.

10. The integrated circuit flash drive memory device of claim 1 in which the protected memory component further stores protected data that is not accessible by the user and is accessible only by the application launcher software or the protected software during installation or running of the application launcher software or the protected software.

11. An integrated circuit memory device connectable by a user to a host computing device for running or executing a protected data on the host computing device without providing said user means to copy the protected data stored on the integrated circuit memory device, the integrated circuit memory device comprising:

a controller for controlling interaction between the integrated circuit memory device and the host computing device;

a memory component that includes a protected memory component storing protected that is installable or executable on the host computing device by said user and is not viewable or accessible by said user;

the integrated circuit memory device being further configurable to include:

means to enumerate with a first device interface description for identifying itself to the host computing device with the first device interface description upon connection to the host computing device, means to install, execute, or run automatically one or more autorun software on the host computing device by said user, means to re-enumerates itself with a second device interface description for identifying to the host computing device with the second device interface description in response to a query and subsequent to running or executing autorun software on the host computing device, means to access protected data, by the one or more autorun software, from the private memory component on the integrated circuit memory device for installing, executing, or running a protected software on the host computing device with the protected data accessed from the private memory component of the integrated circuit memory device, whereby the integrated memory device providing said user to run or execute on the host computing device the protected data stored in the private memory component of the integrated circuit memory device without providing said user means to access and copy the protected data.

12. The integrated circuit memory device of claim 11 in which the protected memory component accessible by the autorun software includes an authenticated step by the autorun software.

13. The integrated circuit memory device of claim 11 in which the protected data stored in the protected memory component is not accessible by said user and is accessible only by the autorun software or the protected software thereby providing copy protection of the protected data stored in the private memory component of the integrated circuit memory device.

14. The integrated circuit memory device of claim 11 further comprising a user operable external manual switch on the integrated circuit memory device that allows a user to select from among plural operating states of the integrated circuit flash memory device.

15. The integrated circuit memory device of claim 14 in which the user operable external manual switch allows a user to select from among more than two operating states, one of which includes operation of a wireless component in the integrated circuit drive memory device.

16. The integrated circuit memory device of claim 11 further comprising a connection that is connectable to a Universal Serial Bus port.

17. The integrated circuit memory device of claim 11 in which the memory component includes an external memory added to the integrated circuit memory device.

18. The integrated circuit memory device of claim 11 further comprising a Universal Serial Bus hub for enabling interface with one or more functional components or devices.

19. The integrated circuit memory device of claim 18 in which the Universal Serial Bus hub includes one upstream port and one or more downstream ports for interfacing or connecting to one or more functional components or devices.

20. The integrated circuit flash drive memory device of claim 11 further including a public memory component that can be viewed or accessed by the user.

21. The integrated circuit memory device of claim 11 further comprising a wireless component for adding wireless interface to the host computing device upon plugging the integrated memory circuit device to the host computing device.

22. The integrated circuit wireless device of claim 21 in which the wireless component includes at least one of a wireless network component and a Bluetooth wireless component, individually or in any combination.

23. The integrated circuit memory device of claim 11 in which the protected data is not accessible by the user and is accessible only by the one or more autorun software or the protected software thereby providing copy protection of the protected software or protected data.

24. A method for adding wireless interface to a host computing device with an integrated circuit wireless device connectable to a host computing device, the integrated circuit wireless device including a wireless component for adding wireless interface to the host computing device with the wireless component, a memory component that includes a private memory component for storing at least part of a protected data that is operable or executable by a user on the host computing device and cannot be copied by said user, the method of adding wireless interface to the host computing device comprising:

activating the integrated circuit wireless device for adding wireless interface to the host computing device upon connecting the wireless integrated circuit device to an interfacing port of a host computing device;

identifying with a first device interface description to the host computing device by the wireless integrated circuit device;

running automatically one or more autorun software stored on the integrated circuit wireless device upon activation of the integrated circuit wireless device with the host computing device;

re-enumerating, by the wireless integrated circuit device, with a second device interface description for identifying to the host computing device with a second device interface description, the re-enumeration being subsequent to running the one or more autorun software on the host computing device;

accessing the protected data from the private memory component, by the one or more autorun software, the protected data for installing, executing or running a protected software on the host computing device for adding wireless interface to the host computing device;

installing, executing or running the protected software on the host computing device with the protected data accessed from the private memory component by the one or more autorun software;

wherein the integrated circuit wireless device adds wireless interface to the host computing device by enabling said user to install, execute or run the protected data stored in the protected memory component of the integrated circuit wireless device without providing said user means to view, access or copy the protected data stored in the protected memory component of the integrated circuit wireless.

25. The method of claim 24 in which the wireless component includes at least one of a wireless network component and a Bluetooth wireless component, individually or in any combination.

26. The method of claim 24 in which access to the protected software by the autorun software requires authentication of the autorun software.

27. The method of claim 24 in which the integrated circuit wireless device further including a user operable external manual switch on the integrated circuit wireless device for allowing a user to select from among more than two operating states.

28. The method of claim 24 further comprising connecting to the interfacing port of the host includes a Universal Serial Bus port.

29. The method of claim 28 further comprising a Universal Serial Bus hub for enabling interface with one or more functional components or devices, the Universal Serial Bus hub includes one upstream port for interfacing with the host computing device and one or more downstream ports for interfacing or connecting to one or more functional components or devices.

30. The method of claim 24 in which the integrated circuit wireless device further including
an upstream port for interfacing with the host computing device, and
two or more downstream ports, the two or more downstream ports having at least one downstream port associated with at least the wireless component and at least one downstream port associated with the memory component.

31. The method of claim 24 further including a public memory component that can be viewed or accessed by the user.

32. The method of claim 24 in which the memory component includes a protected memory component that stores protected data that is not viewable or accessible by the user and is accessible only by the one or more autorun software or the protected software thereby providing copy protection of the protected data.

33. An integrated circuit wireless device connectable by a user to a host computing device for adding wireless interface to the host computing device with the integrated circuit wireless device, the integrated circuit wireless device comprising:
a controller for controlling interaction between the integrated circuit wireless device and the host computing device;

a wireless component for adding wireless interface to the host computing device with the wireless component subsequent to plugging the integrated circuit wireless device to the interfacing port of the host computing device;

a memory component that includes a private memory component for storing at least part of a protected data that is installable or executable by said user on the host computing device and is not accessible or copyable by said user; and one or more autorun software stored on the integrated circuit wireless device that runs automatically on the host computing device upon activation of the integrated circuit wireless device with the host computing device, the one or more autorun software including means for accessing the protected data from the private memory component, the protected data for installing, executing or running a protected software on the host computing device for adding wireless interface to the host computing device;

wherein the integrated circuit wireless device enabling said user adding wireless interface to the host computing device employing the protected data stored in the protected memory component of the integrated circuit wireless device without providing said user means to view, access and copy the protected data stored in the protected memory component of the integrated circuit wireless.

34. The integrated circuit wireless device of claim 33 further comprising, means for identifying with the host computing device with a first device interface description, and means for re-enumerates itself with a second device interface description and identifies to the host computing device with the second device interface description subsequent to an autorun operation and a query.

35. The integrated circuit wireless device of claim 33 in which the integrated circuit wireless device having an upstream port for interfacing with the host computing device and two or more downstream ports, the two or more downstream ports having at least one downstream port associated with at least the wireless component.

36. The integrated circuit wireless device of claim 35 in which the protected data that is not viewable or accessible by the user and is only accessible by the one or more autorun software upon authentication of the one or more autorun software, thereby providing copy protection of the protected data.

37. The integrated circuit wireless device of claim 33 in which the wireless component is a Wireless Local Area Network component.

38. The integrated circuit wireless device of claim 33 further includes an external memory component and the integrated circuit wireless device operable as an external memory storage device and an external wireless device to the host computer.

39. The integrated circuit wireless device of claim 33 in which the wireless component being one of a WiFi component and a Bluetooth wireless component, individually or in any combination.

40. The integrated circuit wireless device of claim 33 further including public memory component that can be viewed or accessed by the user.

* * * * *